(12) United States Patent
Herman et al.

(10) Patent No.: US 10,348,404 B1
(45) Date of Patent: Jul. 9, 2019

(54) VISIBLE LIGHT COMMUNICATION SYSTEM WITH PIXEL ALIGNMENT FOR HIGH DATA RATE

(71) Applicant: FORD GLOBAL TECHNOLOGIES, LLC, Dearborn, MI (US)

(72) Inventors: David M. Herman, Southfield, MI (US); Grant Inskeep, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/975,033

(22) Filed: May 9, 2018

(51) Int. Cl.
*H04B 10/116* (2013.01)
*H04B 10/50* (2013.01)
*H04B 10/67* (2013.01)

(52) U.S. Cl.
CPC ......... *H04B 10/116* (2013.01); *H04B 10/502* (2013.01); *H04B 10/67* (2013.01)

(58) Field of Classification Search
CPC .............. H04B 10/11–116; H04B 10/60–6973
See application file for complete search history.

(56) References Cited

U.S. PATENT DOCUMENTS

| | | | |
|---|---|---|---|
| 9,450,671 | B2 | 9/2016 | Chen et al. |
| 9,791,727 | B2 | 10/2017 | Aoyama et al. |
| 2006/0140445 | A1 | 6/2006 | Cusack, Jr. |
| 2009/0153710 | A1 | 6/2009 | John |
| 2016/0180810 | A1* | 6/2016 | Maeda ................. H04B 10/116 345/589 |
| 2017/0244482 | A1* | 8/2017 | Dimare ................. H04B 10/116 |

FOREIGN PATENT DOCUMENTS

| | | |
|---|---|---|
| CN | 103841732 A | 6/2014 |
| CN | 107370538 A | 11/2017 |
| CN | 105515657 B | 1/2018 |
| CN | 107612617 A | 1/2018 |
| JP | 2011055397 A | 3/2013 |
| KR | 101798043 B1 | 11/2017 |

OTHER PUBLICATIONS

Duy Thong Nguyen, et al., Data Rate Enhancement of Optical Camera Communications by Compensating Inter-Frame Gaps, Optics Communications 394 (2017) 56-61.

(Continued)

*Primary Examiner* — Casey L Kretzer
(74) *Attorney, Agent, or Firm* — Frank L. Lollo; MacMillan, Sobanski & Todd, LLC

(57) ABSTRACT

A visible light communication system has a two-dimensional array of sources and an image sensor with a pixel grid defining a pixel direction (which in some embodiments is a rolling shutter direction). Modulation of the light flashes the sources to define a series of one-dimensional patterns encoding the data to be transmitted. The patterns extend in a direction that projects onto the imager orthogonal to the pixel direction. In the case of a rolling shutter, the pattern is orthogonal to the rolling shutter direction, which allows the encoding of multiple bits per line of the image frame. In other cases, the orthogonal direction obtains the maximum resolving power available from the image sensor.

14 Claims, 9 Drawing Sheets

(56) References Cited

OTHER PUBLICATIONS

Chi-Wai Chow, et al., Visible Light Communication Using Mobile-Phone Camera with Data Rate Higher than Frame Rate, Optics Express, vol. 23, No. 20, 2015.
Takaya Yamazato, et al., Image-Sensor-Based Visible Light Communication for Automotive Applications, IEEE Communications Magazine, Jul. 2014.
Yuki Goto, et al., A New Automotive VLC System Using Optical Communication Image Sensor, IEEE Photonics Journal, vol. 8, No. 3, Jun. 2016.
Trang Nguyen et al, Design and Implementation of a Novel Compatible Encoding Scheme in the Time Domain for Image Sensor Communication, Sensors 2016.
Nilufa Yeasmin, et al., Traffic Control Management and Road Safety Using Vehicle to Vehicle Data Transmission Based on Li-Fi Technology, International Journal of Computer Science, Engineering and Information Technology (IJCSEIT), vol. 6, No. 3/4, Aug. 2016.
Trong-Hop Do, et al., Performance Analysis of Visible Light Communication Using CMOS Sensors, Sensors 2016, 16, 309.
Michael Vasilakis, DynaLight: A Dynamic Visible Light Communication Link for Smartphones, Master's Thesis, Delft University of Technology, 2015.

\* cited by examiner

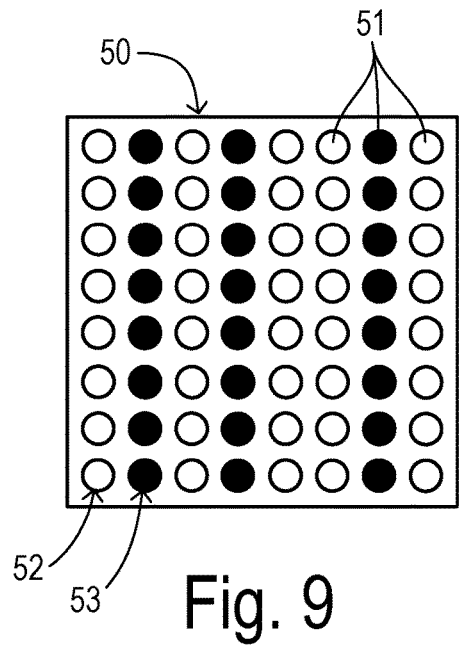
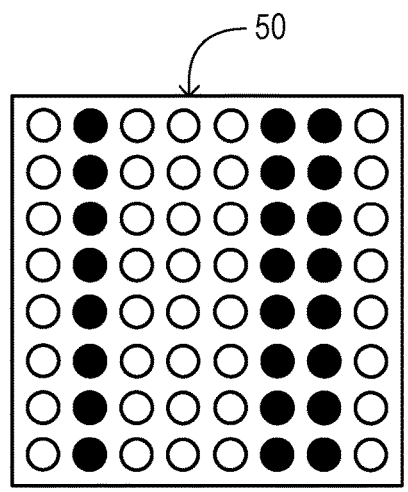
Fig. 9            Fig. 10
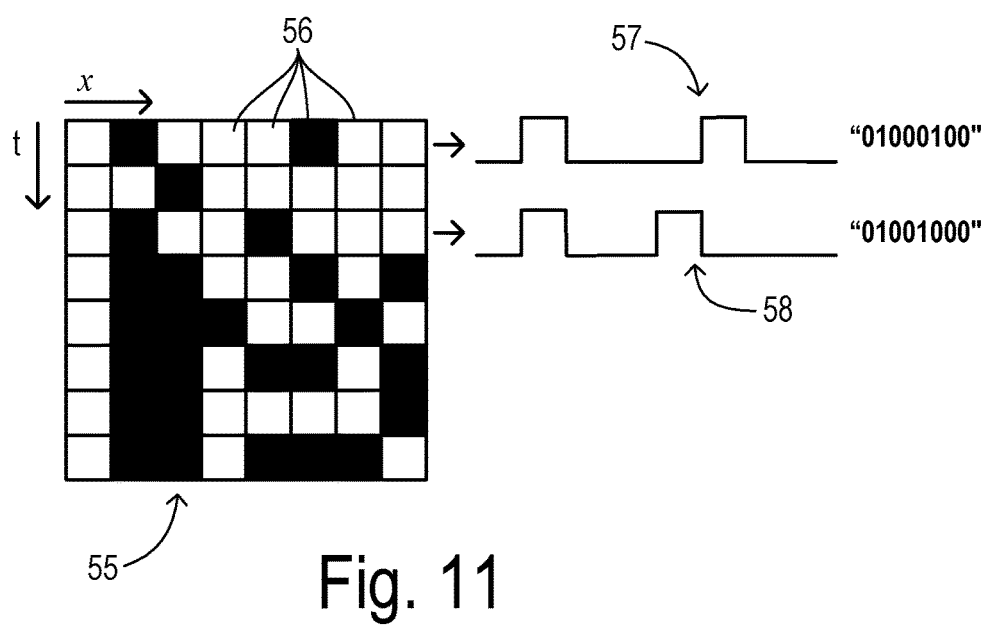
Fig. 11

VISIBLE LIGHT COMMUNICATION SYSTEM WITH PIXEL ALIGNMENT FOR HIGH DATA RATE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to visible light communication (VLC) sending digital data, and, more specifically, to optimizing alignment of generated light patterns to a pixel array of an image sensor to increase parallel data transmission capabilities.

Visible light based communication (VLC), also referred to as LiFi, is a wireless data communication technology being actively researched for automotive applications and for consumer electronics applications. Data transmission involves modulating (i.e., flashing) a light source such as a light emitting diode (LED) to encode data, and receiving the modulated light at a light sensor such as a photodiode or a camera to decode the data.

A vehicle having a VLC receiver might receive VLC signals from a fixed source (e.g., an LED traffic light) or from a mobile source (e.g., an LED signal light on another car). The data being shared may be related to traffic information or control, hazard warnings, navigation assistance, and many other types of data. A preferred image sensor is a "camera on a chip" comprising a two-dimensional array of pixels for capturing successive image frames taken at a rate that can distinguish the flashing of the light source. A camera with a wide field of view is desirable in order to detect and track a VLC image source, or even multiple sources simultaneously. A typical VLC transmitter uses a singular LED or an array of LEDs acting in unison. To increase the rate at which VLC data can be exchanged, individual LEDs or groups of LEDs can be modulated independently to provide parallel bit streams in the data transmission (e.g., taking advantage of a rolling shutter, as explained below). The number of separate streams based on a transmitter LED array and a receiver pixel array depends on various optical characteristics (separation distance, field of view, numbers of LED elements in the arrays, relative motion, exposure duration per pixel row, etc.) which determine the number of separate regions that can be generated by the LED array that fall within the resolution (resolving power) of the image sensor.

Complementary metal-oxide semiconductor (CMOS) image sensors are particularly advantageous since they provide good image quality with low power requirements, are low cost, and are often already present on a vehicle as an object detection sensor for other vehicle systems (e.g., a lane departure monitor). CMOS image sensors are also common on other types of devices which may be used as VLC receivers, such as smartphones.

A CMOS imager utilizes an image read-out process known as a rolling shutter, wherein the image exposure and read-out functions are conducted on a row-by-row basis (i.e., the rows of pixel are converted into a digital signal one row at a time). As used herein, the terms "row" and "column" are used interchangeably since CMOS sensors are available in different configurations that handle lines of pixels from top to bottom of an image and from side to side. Moreover, the CMOS sensor could be placed on mounted to a printed circuit board (PCB) oriented in any orthogonal direction, and the camera containing the PCB could be attached to the vehicle such that the row and column directions have been rotated to any orthogonal direction (based on the mounting requirements). The use of a rolling shutter results in a temporal aliasing, wherein the image's pixel row/columns include a slight time delay that may capture artifacts in moving objects or changes in lighting levels in the scene since different rows within a single image frame will capture the same object at slightly different times. This property of the rolling shutter has been used to increase the data rate of a VLC transmission by flashing the LED source at a frequency corresponding to the exposure times of successive rows (requiring that the LED source spans a plurality of the pixel rows in the camera). The resulting image of the LED source consequently displays alternating bands of light and dark lines which encode successive bits in a serial data stream.

It would be desirable to further increase data transmission speeds with a robust, reliable system that maintains low cost and which enables more data-hungry applications.

SUMMARY OF THE INVENTION

In one aspect of the invention, a light communication system comprises a transmitter modulating an array of light sources to encode data and a receiver with a two-dimensional array of pixels defining rows and columns. The pixel array images the sources to receive the data using a rolling shutter in a predetermined direction. The transmitter and receiver exchange performance characteristics after the receiver detects modulation of the sources. The transmitter further modulates the sources to encode bits of the data in adjacent sub-blocks of the sources aligned in a one-dimensional pattern extending orthogonal to the predetermined direction as received by the receiver. In one preferred embodiment, the transmitter adjusts the alignment of the one-dimensional pattern according to the identification of the predetermined rolling shutter direction.

According to another aspect of the invention, a method for light communication includes arranging an imager to receive light from an array of sources, wherein the imager has a pixel grid defining a pixel direction. Light from the sources to the imager is modulated by flashing according to a series of one-dimensional patterns encoding data, each one-dimensional pattern extending in a direction that projects onto the imager orthogonal to the pixel direction. An image is read-out from the imager resulting in a two-dimensional pattern encoding the data. The respective patterns from a plurality of corresponding pixel rows in the pixel grid are identified, and the patterns are decoded to recover the encoded data.

BRIEF DESCRIPTION OF THE DRAWINGS

FIGS. 9 and 10 are plan views showing elements of an LED array which are modulated in accordance with the invention to include a one-dimensional pattern extending orthogonal to a predetermined row/column direction of the image sensor.

FIG. 11 shows an image taken of the LED array of FIGS. 9 and 10 using a rolling shutter, resulting in alternating pixel regions within each image row according to the one-dimensional pattern.

DETAILED DESCRIPTION OF PREFERRED EMBODIMENTS

The invention provides improved rates of data transfer as a result of achieving particular alignments between the row/column directions of the transmitting array of light sources and the row/column directions of the receiving array of image sensor pixels. For example, a two-dimensional array of sources and an image sensor are spatially arranged so that modulated light from the source array is received by the sensor. The image sensor has a pixel grid defining a pixel direction (which in some embodiments is a rolling shutter direction). The flashing defines a series of one-dimensional patterns encoding the data to be transmitted. The patterns extend in a direction that projects onto the imager orthogonal to the pixel direction. In the case of a rolling shutter, the pattern is orthogonal to the rolling shutter direction, which allows the encoding of multiple bits per line of the image frame. In other cases, the orthogonal direction obtains the maximum resolving power available from the image sensor.

Figure 1:
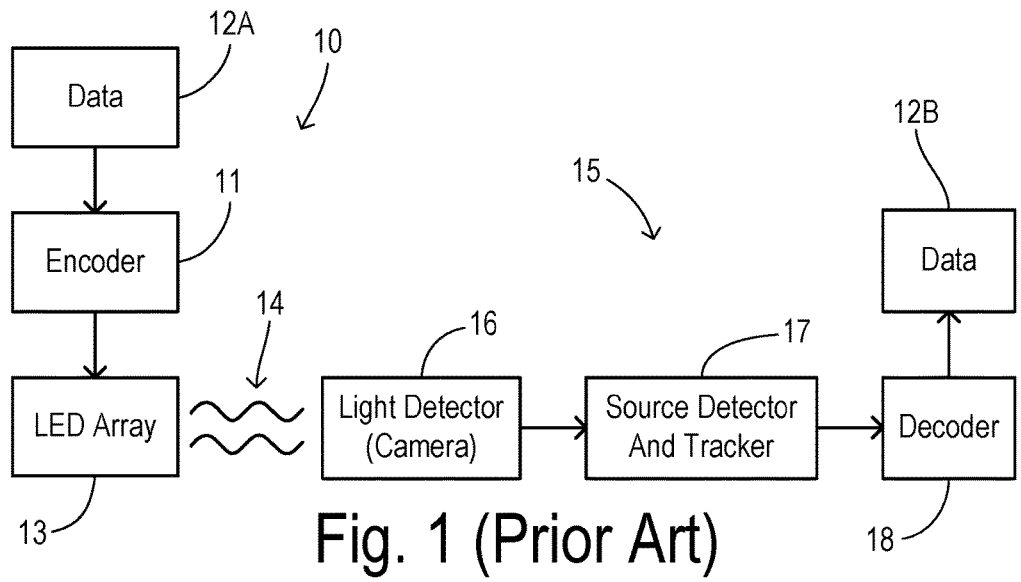
FIG. 1 is a block diagram showing a conventional VLC system.

FIG. 1 shows a conventional visible light communication system having a VLC transmitter 10 and a VLC receiver 15. Transmitter 10 includes an encoder 11 which receives data 12A to be transmitted, and which drives an LED array 13 to emit a flashing VLC light signal according to the encoded data. LED array 13 may be part of a dual purpose light source which adds the VLC function to a traffic light, vehicle running light, a LCD/OLED display of a mobile device (e.g. a cell phone), fixed display or signage, or other types of artificial lighting applications. Visible light 14 projected from LED array 13 flashes at a high rate which is undiscernible to the human eye but which carries data to a light detector 16 (e.g., a camera) in receiver 15. A source detector and tracker 17 receives a succession of image frames from camera 16, and uses known techniques for identifying any transmitting VLC sources and extracting the flashing signals inherent in the collected frames. The flashing information is then processed by a decoder 18 which recovers data 12B as a copy of the original data 12A sent by transmitter 10.

Figure 2:
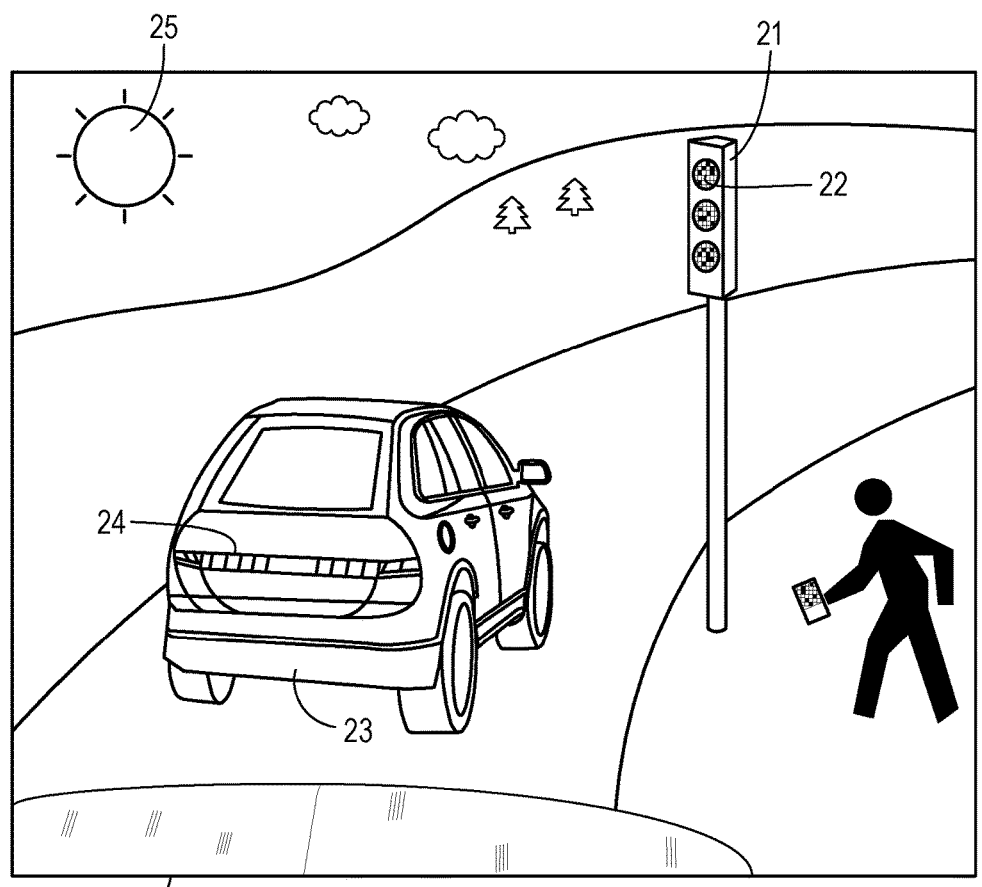
FIG. 2 shows an example of a video frame captured by an image sensor with multiple light sources visible in the frame.
Figure 3:
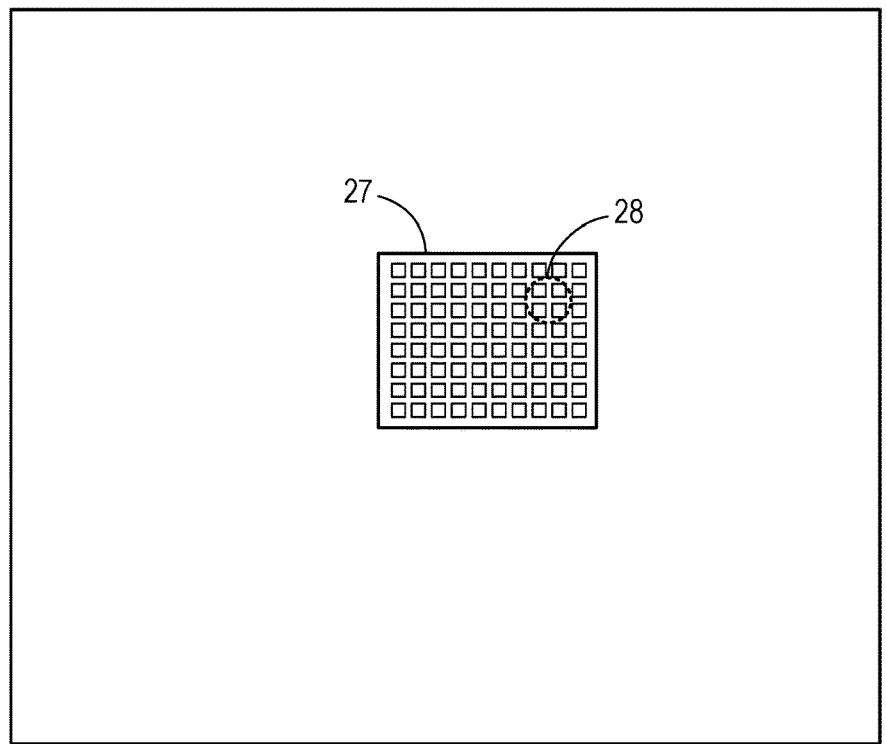
FIG. 3 shows a video frame in which a VLC source array is visible wherein the resolving power of the image sensor is sufficient to distinguish a plurality of separate sub-blocks of sources in the source array.

FIG. 2 shows a sample image taken by a receiving camera which may include more than one potential source of VLC signals. A traffic light 21 includes an LED array 22 as part of the production of traffic signals, and a vehicle 23 includes an LED array 24 as part of a brake or taillight of vehicle 23. A typical image my include other natural or artificial light sources that need to be examined as to whether they carry VLC signals, such as the sun 25. The source detector and tracker uses conventional techniques in order to identify objects in the images having the characteristic flashing of standard VLC signals, and then the corresponding objects are inspected to extract the standard VLC signals. Depending upon the distance between a receiving camera and an array of VLC sources and other factors, it may be possible to resolve individual light sources or sub-groups of light sources within a detected source array. Based on the resolving power of a typical camera and on the size of individual LEDs in a typical LED array, it would usually not be possible for the camera to resolve an individual LED. However, the VLC light source may typically have a large number of LEDs arranged in a two-dimensional grid, and the full grid may have an apparent size on the camera that spans many rows and columns of pixels in the camera. As shown in FIG. 3, an array 27 is seen within an image frame 26 at a sufficient resolving power that a sub-group of LEDs 28 can be separately resolved. Therefore, array 27 could potentially be used to generate several data streams in parallel for broadcasting to the receiving camera.

Figure 4:
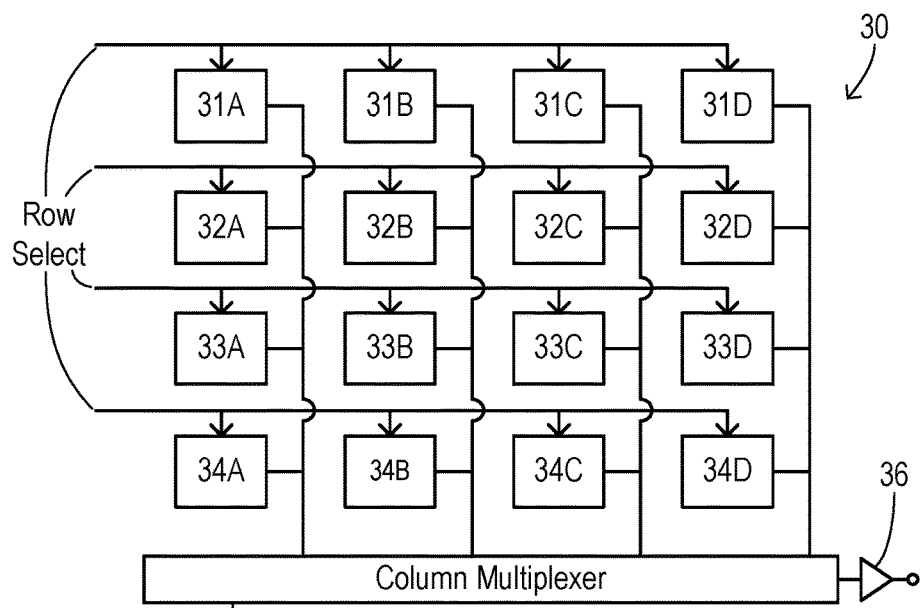
FIG. 4 is a block diagram of a portion of a CMOS image sensor.

FIG. 4 shows a portion of a typical CMOS camera 30. A top row of pixels 31 has individual pixels 31A, 31B, 31C, and 31D. Rows 32, 33, and 34 are arranged beneath row 31, so that all the individual pixels fall into columns A, B, C, and D. A set of Row Select lines each respectively connects to the pixels of a respective row. Output lines from each respective pixel of the same column are directly connected to a column multiplexer 35 in common. An output from column multiplexer 35 is amplified through a buffer amplifier 36 to provide readout of image frames from camera 30 as known in the art. A particular Row Select line is activated during the time that a particular row is read out, so that only the outputs of that row are sent to column multiplexer 35 at any one time.

Figure 5:
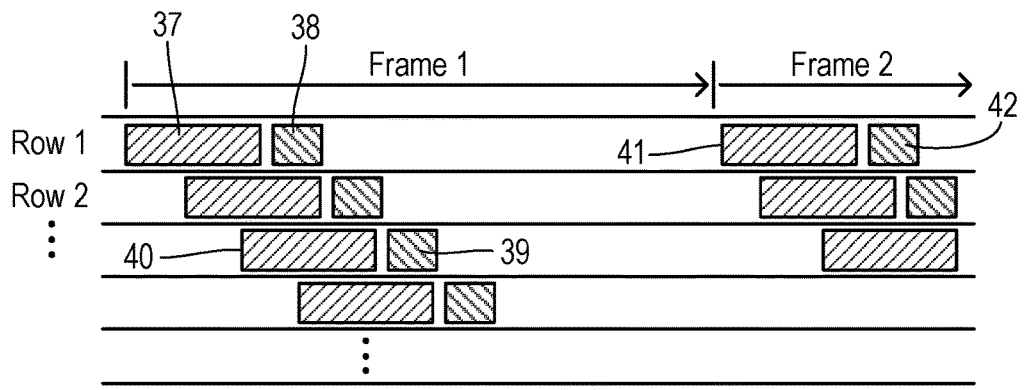
FIG. 5 is a timing diagram showing exposure times and read-out times for various rows in a rolling shutter process.

Operation of the rolling shutter process in a CMOS camera is shown in FIG. 5. Each respective row has its own respective image integration time and readout time which are staggered with respect to the other rows. Thus, a first pixel Row 1 has an image integration time 37 and a readout time 38. Some rows can be integrating an image at the same time but all rows must have separate readout times. Thus, Row 2 has an integration time 40 followed by a readout time 39. Collection of a first image frame (Frame 1) ends after the last row has been read out. Then a subsequent frame (Frame 2) begins with integrating an image in Row 1 during image integration time 41, which is followed by a readout time 42.

Figure 6:
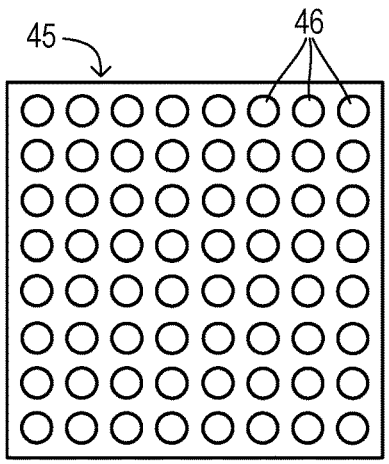
FIGS. 6 and 7 are plan views showing elements of an LED array which is modulated between ON and OFF states, respectively.

Using the separate image integration times and readout times for different rows that occur in a rolling shutter camera, it has been known to transfer VLC data at a rate higher than the frame rate of a CMOS camera by alternately flashing the LED light source to be ON or OFF during the staggered times that respective pixel rows are actively integrating an image (the ON/OFF flashing or other types of variation within the LED output can encode the data according many known types of modulation). As shown in FIG. 6, an LED array 45 with individual LEDs 46 may be on at a first instant of time $t_1$. At another instant of time t2 shown in FIG. 7, LEDs 46 within array 45 are turned off. By controlling the ON and OFF flashing to repeat at a rate faster than the amount of time required for reading all of the rows covering the light source, light and dark bands 48 appear in a single image frame 47 as shown in FIG. 8. In this example, the rolling shutter moves from top to bottom so that the LED array is shown at a slightly later time moving downward in the resulting image frame. Light and dark bands 48 can be converted to a digital signal 49 that transitions between high and low logic levels. Digital signal 49 can be interpreted as an On/Off keying signal to pass binary information across the resulting image in which the rows encode the information directly. Other keying strategies can also be used including color based, frequency based, pulse position modulation (PPM), and pulse amplitude modulation (PAM) as known in the art, and all such strategies can be utilized in the present invention.

Figure 7:
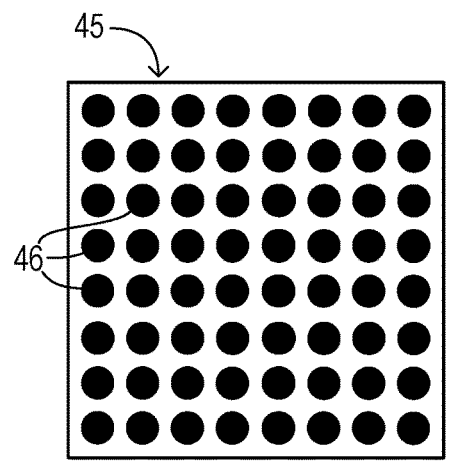
Figure 8:
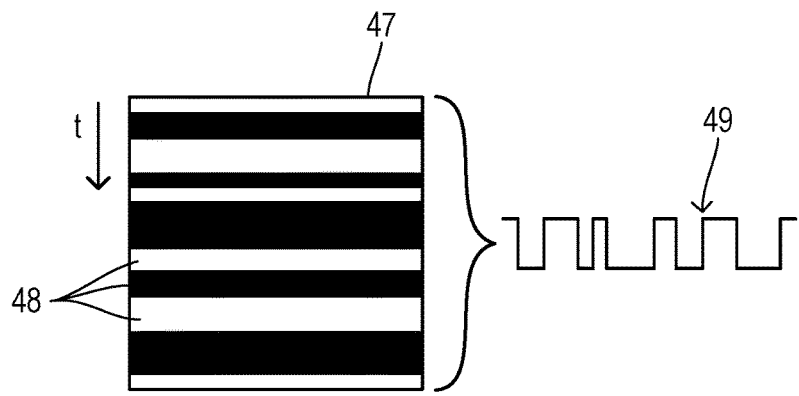
FIG. 8 shows a portion of an image frame resulting in alternating light and dark bands in an image taken of the LED array of FIGS. 6 and 7 using a rolling shutter.

With the technique of FIG. 6-8 for treating each row of a CMOS image sensor in a rolling shutter frame to collect a corresponding data point, the data transmission rate is increased by a factor determined by the time between integration of successive rows. The data transfer remains to be a single "bit stream" since all the LEDs in the transmitting array are turned On and Off in unison, even though the CMOS image sensor is capable of resolving smaller sub-blocks of the LED sources. Operation in unison has ensured that the bands encoding the bit stream are reliably created in the camera images. One embodiment of the present invention obtains a further increase in the data transmission rate by encoding more than just a single information "bit" into each row of the rolling shutter frame. The ability to achieve this increase is obtained by using a plurality of sub-blocks within the LED array to generate separately resolvable bit regions by the pixels of the CMOS sensor, while further imposing a condition that a one-dimensional On/Off pattern generated by the bit regions extends in a direction that has a particular orientation with respect to a predetermined row/column direction of the CMOS sensor. When the CMOS sensor uses a rolling shutter, then the direction of the one-dimensional pattern extends orthogonal to the direction of the rolling shutter rows of pixels. For example, if the CMOS sensor's rolling shutter direction is aligned orthogonally to the row/column layout of the LED array, and if the CMOS sensor and LED array are positioned at a optimal distance based on the camera's lens optical characteristics, LED array size, and pixel size, then it becomes possible to utilize all of the camera's pixels to transmit data at much faster data transmission rates.

Orthogonal pattern generation for a preferred embodiment is shown in FIGS. 9-11. An LED array 50 includes a plurality of source (e.g., LED) sub-blocks 51 arranged in a two-dimensional grid of rows and columns. Depending upon the distance between the transmitter and receiver, sub-blocks 51 may each comprise a cluster or region of individual LEDs with sufficient area that each sub-block 51 is separately resolvable by the receiving image sensor. In the event that a camera is sufficiently close to LED array 50 that it can resolve a single LED, then each sub-block 51 may be comprised of a single LED. For increasing the data encoded in each row of a received image, the flashing of sub-blocks 51 which modulates to encode bits of the transmitted data is arranged in a one-dimensional pattern extending horizontally. Thus, the pattern changes from left to right and is constant from top to bottom along columns 52 and 53 (i.e., the sub-blocks in the columns are turned on and off in unison). The number of rows from top to bottom preferably corresponds to the full usable size of array 50 since it maximizes the amount of data that can be sent during one frame of the image sensor. FIG. 9 shows the pattern at a first instant in time. FIG. 10 shows the pattern at a second instant of time when sub-blocks of array 50 exhibit a different one-dimensional pattern extending horizontally.

In a preferred embodiment with a rolling shutter, the CMOS image sensor collects an image of source array 50 such that the direction of the rolling shutter proceeds vertically from the top to the bottom of array 50. Therefore, the direction of the one-dimensional pattern (horizontal) is orthogonal to the rolling shutter direction (vertical) in which the row-by-row readout of an image occurs. As a result, a complete image frame of array 50 collected by the image sensor has the appearance shown in FIG. 11 (there may be an offset between data packets and images as known in the art). Thus, an image frame 55 of the LED array includes individual pixels 56 wherein each horizontal row of pixels corresponds to a distinct "snapshot" of the LED source array. A respective one-dimensional pattern used in encoding the data by the LED source array appears in each horizontal row. The frame data is encoded in a horizontal direction x along each image row and encoded in the vertical direction for rows collected at a different time t resulting from the rolling shutter. The ON/OFF states of the pixels in each row are used to generate a digital signals 57 and 58 for the indicated rows in this example of the encoding.

Figure 12:
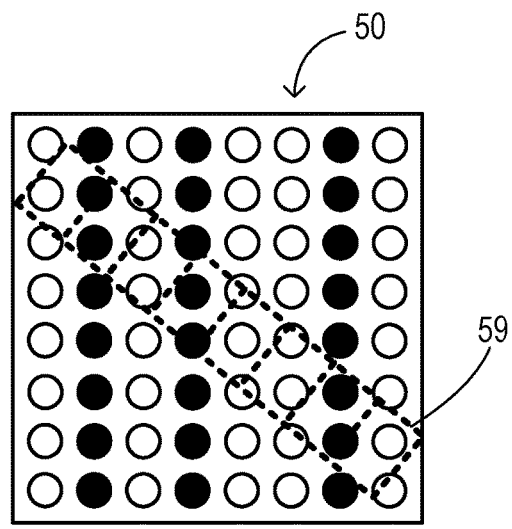
FIG. 12 shows an illuminated LED array wherein an image field is shown corresponding to a row of an image sensor when the alignment of the one-dimensional pattern is not orthogonal.

In order to reliably distinguish each separate parallel data bit region encoded in the one-dimensional patterns of FIGS. 9 and 10, the alignment of the one-dimensional pattern direction should be reasonably close to orthogonal to the rolling shutter direction of the CMOS image sensor. FIG. 12 shows an image capture area 59 of a pixel row of the image sensor which is collected using a rolling shutter, wherein there is a misalignment between the top-down and side-to-side axes of the grids of the LED array and the image sensor. Misalignment may result from normal changes in road surface conditions, other relative movements between transmitter and receiver, inherent differences in the design or installation of components, rolling motion, differences in axial orientations, and image distortions resulting from optical errors, translation, or image perspective (i.e., not viewing the LED array face on). For example, some CMOS sensors are made with a vertical rolling shutter and some are made with a horizontal rolling shutter, so that a transmitting array that only generated the patterns in one direction could not properly align with CMOS sensors of both types (and even if it could, issues related to perspective, optical distortion, and translation could still create problems for resolving the patterns).

Depending on the severity of misalignment, the image that would result for a pixel row having misaligned capture area 59 could fail to correctly exhibit the desired ON/OFF pattern. For use in situations where the desired alignment could not be automatically ensured, the present invention introduces two-way communication between a VLC transmitter and a VLC receiver in order to orient the transmitted images from the LED array such that the desired alignment is maintained. Since there would typically be a large number of individual LEDs included in each sub-block of the generated data pattern (due to the sizes of the expected LED arrays and the average distance between the transmitter and receiver), it would usually be feasible to alter the direction of the one-dimensional pattern generated on the LED array to almost any arbitrary direction while maintaining accurate reproduction of the pattern.

Figure 13:
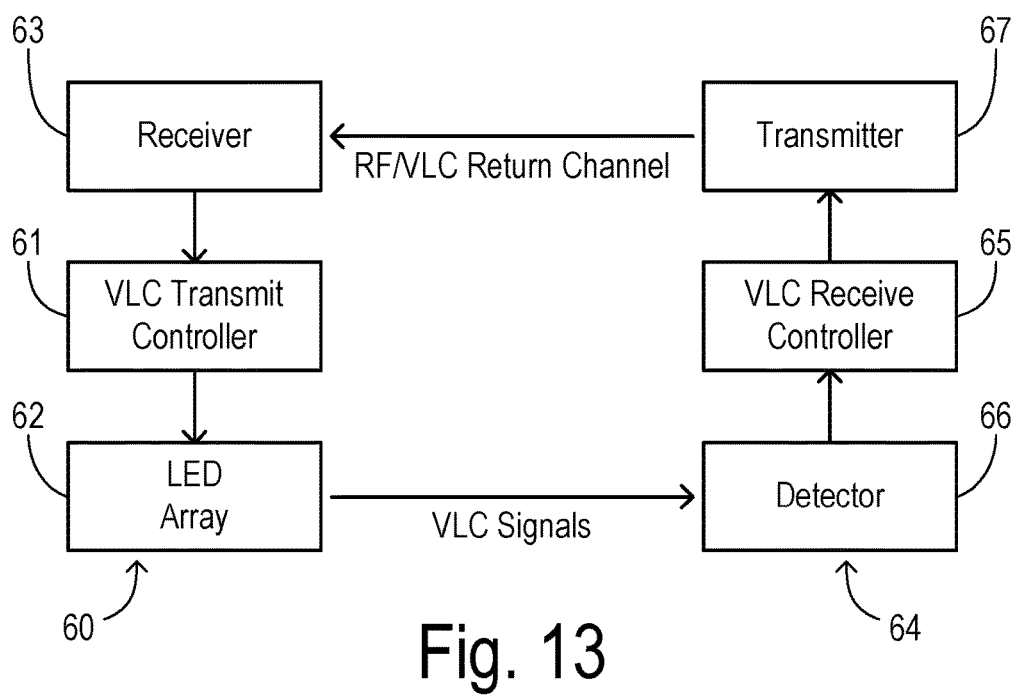
FIG. 13 is a block diagram showing a VLC system of the present invention with two-way communication.
Figure 14A:
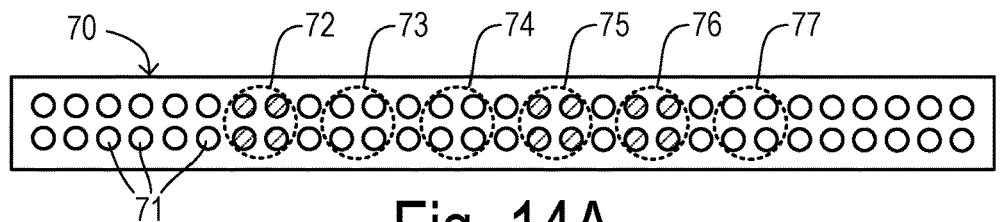
FIGS. 14A-14C show a time changing illumination pattern from an LED array.
Figure 14B:
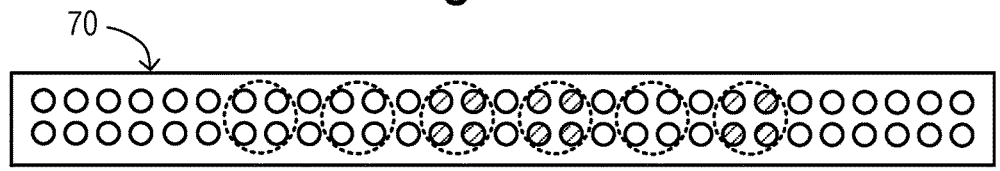
Figure 14C:
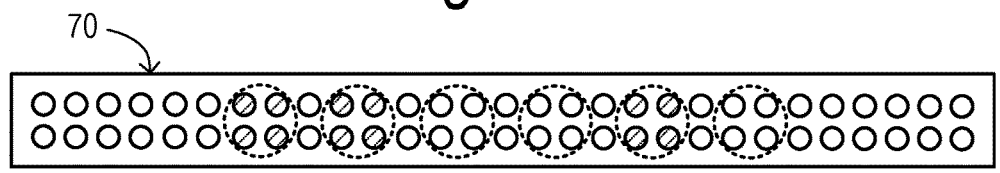
Figure 14D:
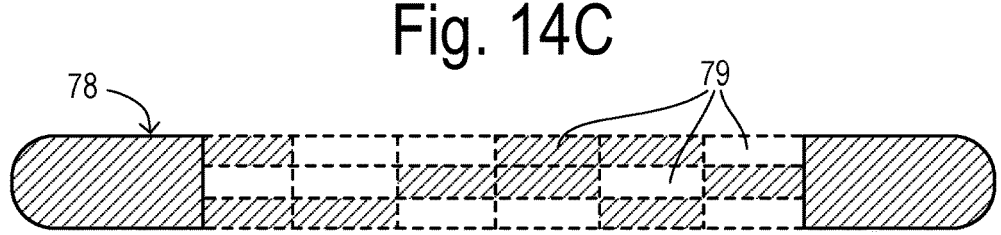
FIG. 14D shows a resulting rolling-shutter image frame.

As shown in FIG. 13, a VLC transmitter 60 includes a VLC transmit controller 61 and an LED array 62. In this embodiment, a receiver 63 in VLC transmitter 60 forms part of a return channel between VLC transmitter 60 and a VLC receiver 64. VLC receiver 64 includes a CMOS image sensor or other detector 66 coupled to a VLC receive controller 65. A transmitter 67 connected to VLC receive controller 65 forms another portion of the return channel with receiver 63 using any convenient communication technology, such as a VLC return channel or an RF-based channel (e.g., Wi-Fi) as known in the art. Using the return channel together with the main VLC signal channel between LED array 62 and detector 66, transmitter 60 and receiver 64 mutually exchange performance characteristics which are sufficient to ensure the desired alignment of the one-dimensional flashing pattern with the camera's pixel direction (e.g., rolling shutter direction). In addition, other performance characteristics are exchanged which can be used to operate at the maximum available optical resolution and to improve other aspects of image quality. The performance characteristics can include one or more of the following characteristics: number of light sources (i.e., LEDs), arrangement of light sources, number of receiver pixels, arrangement (rows and columns) of receiver pixels, localization and frequency of data packet transmission errors determined by error checking from prior decoded two-dimensional data pattern (e.g., CRC checks), nominal exposure time for a pixel row of the receiver, apparent size of a sub-block of a modulated group of light sources as detected by the receiver, relative orientations of the transmitter and receiver, relative translation of the transmitter sources and receiver pixels, relative perspective translation of the transmitter and receiver, identification of the rolling shutter direction, and relative movement between the transmitter and receiver.

FIG. 14 shows a further example of the invention wherein an LED array 70 includes individual LEDs 71 extending in a mainly horizontal array of the type that may be present in a vehicle brake light/taillight assembly, for example. Separate sub-blocks 72-77 are uniquely driven in order to generate a one-dimensional pattern for flashing the LEDs according to encoded data for transmitting to a VLC receiver. Each sub-block 72-77 is shown to include a grouping of four individual LEDs. The other LEDs in array 70 are not flashed at a VLC frequency, thereby allowing sub-blocks 72-77 to be separately identified and tracked. In FIG. 14A, a one-dimensional pattern is shown having selected sub-blocks of LEDs being on and off at a first time $t_1$, (with cross-hatching and lack of cross-hatching representing On and Off states). The time $t_1$ persists long enough to cover a major fraction of an image integration time for at least one rolling shutter row that is being exposed to register the data signal on that row and short enough to expose no more than a few rolling shutter rows based on the logic of calculation resulting from the performance characteristics previously transmitted. FIGS. 14B and 14C show different On/Off one-dimensional patterns during subsequent image integration time for subsequent rows (or groups of rows) of the rolling shutter image sensor. FIG. 14D shows a captured image frame depicting the LED array wherein respective image pixel regions 79 have captured the On/Off values of the successive one-dimensional patterns.

Figure 17:
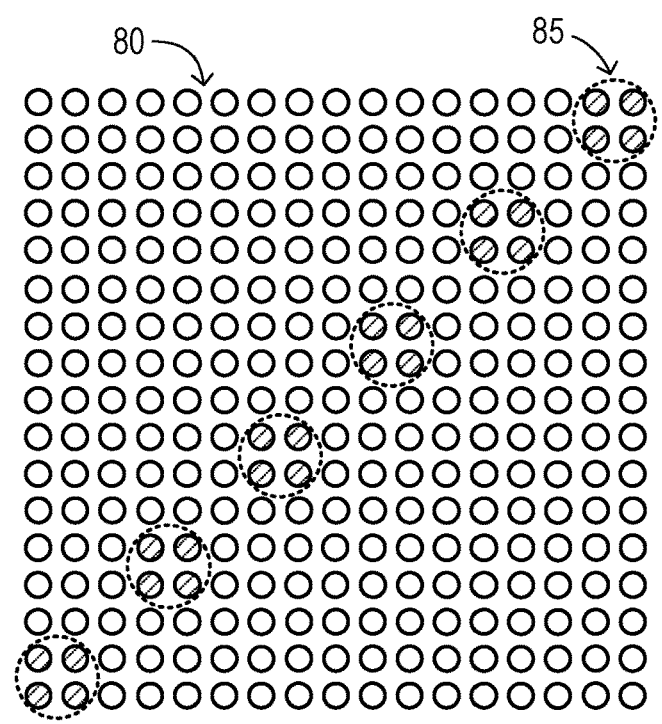
FIG. 17 shows an LED array generating a line of source sub-blocks representing different bit streams, wherein the line is oriented at a predetermined angle with respect to the horizontal and vertical axes of the LED array.

In the example of FIG. 14, a lack of height in the LED array limits the ability to transmit the one-dimensional pattern according to a different direction. However, other arrays with higher numbers of rows and columns of individual LEDs can achieve greater flexibility in the orientation of the one-dimensional pattern (see, for example, FIG. 17).

Figure 16:
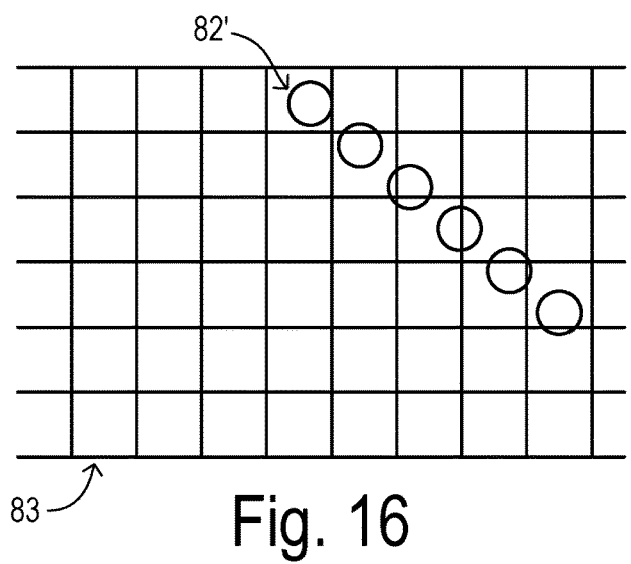
FIG. 16 shows a grid corresponding to a pixel array of the image sensor of FIG. 15 and the locations where the image of the pattern of FIG. 15 falls on the image sensor (i.e., making an angle corresponding to a pixel direction of the image sensor).
Figure 15:
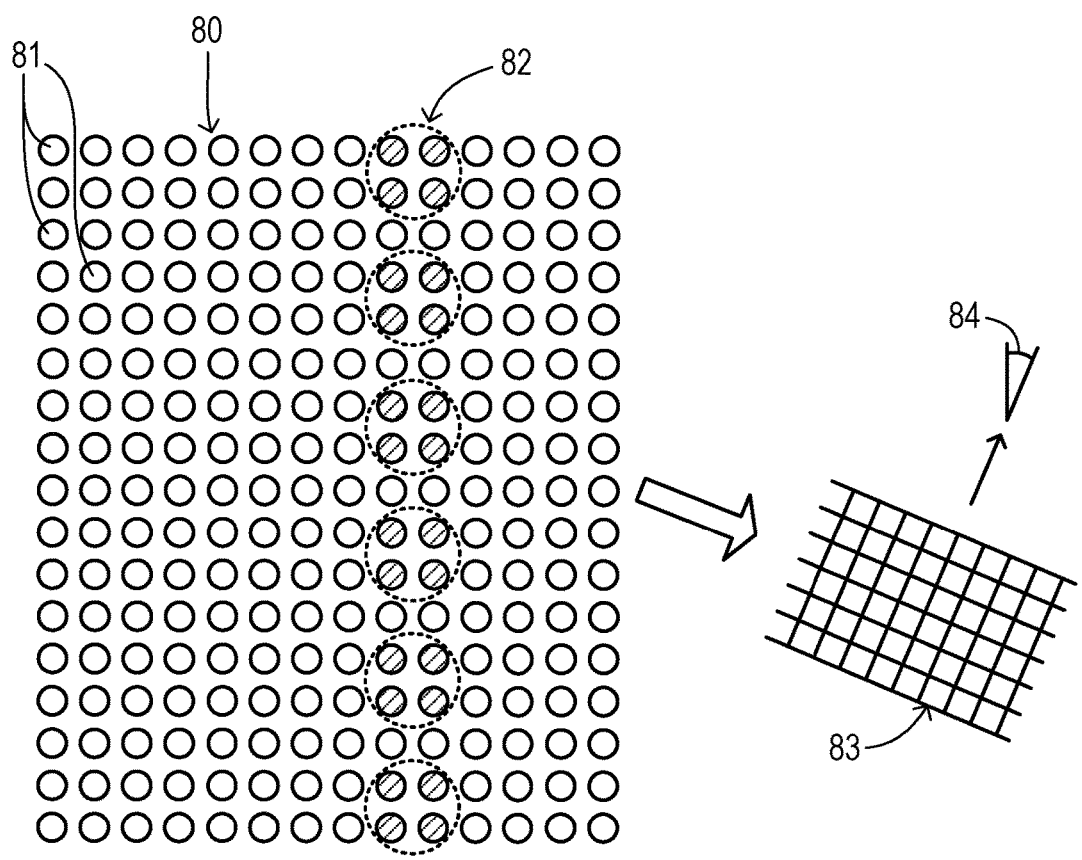
FIG. 15 shows an LED source array generating a one-dimensional data pattern aligned with a vertical axis and illuminating an image sensor which is oriented such that a vertical pixel column lies at an oblique angle to the line of the one-dimensional pattern.
Figure 18:
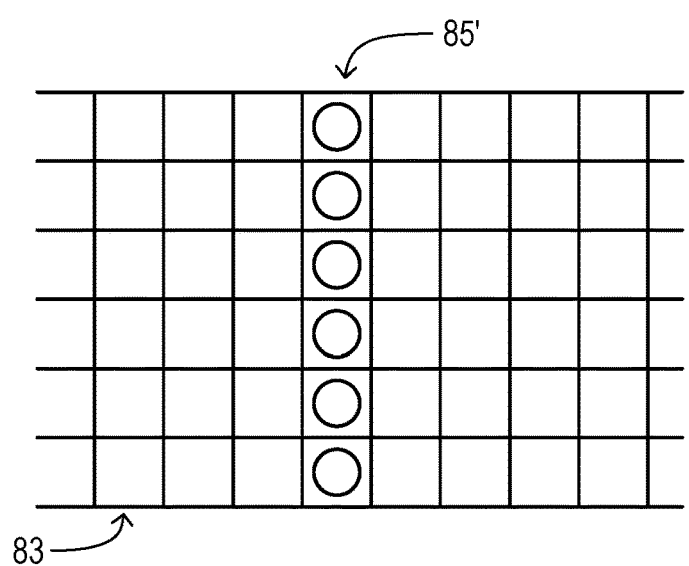
FIG. 18 shows a grid corresponding to the pixel array of FIG. 16 when imaging the sub-blocks as generated in FIG. 17.

An ability to align a one-dimensional pattern on the transmitting LED array can be useful not only for improved data rates with a rolling shutter. Improvements can be obtained with other image sensors, such as a CCD imager using a global shutter (i.e., all pixels of an image being exposed over the same span of time). More specifically, the maximum resolving power of an imager can be obtained when the one-dimensional pattern aligns with either of the orthogonal pixel directions (row or column) because such an alignment avoids spatial aliasing problems. Referring to FIG. 15, an LED array 80 has many rows and columns of individual LEDs 81. A one-dimensional pattern 82 is illustrated being generated vertically by LED sub-blocks in array 80. An image sensor has a grid of pixels 83 imaging LED array 80 from an orientation such that the vertical directions of the respective grids form an misalignment angle 84. In a captured image obtained by the image sensor with the orientations as shown in FIG. 15, one-dimensional pattern 82' falls at a non-orthogonal direction on the captured image as shown in FIG. 16. Based on the size and separation of the sub-blocks in pattern 82' and because of the misalignment, the sub-blocks cannot be separately resolved. On the other hand, after an exchange of performance characteristics between the transmitter and receiver, the misalignment between the respective grids can be determined and then the transmitter can orient the direction of the one-dimensional pattern to be orthogonal to a pixel direction (i.e., aligned in parallel with the other pixel direction) of the camera. Thus, LED array 80 generates a slanted one-dimensional pattern 85 shown in FIG. 17. When slanted one-dimensional pattern 85 is captured by the image sensor, the resulting image in pixel grid 83 shown in FIG. 18 displays a one-dimensional pattern 85' that aligns along one of the orthogonal directions of grid 83 (either horizontal or vertical can be used). Since aliasing problems are avoided, the same size of LED sub-blocks can be clearly resolved in FIG. 18. In order to identify any discrepancy between the grid axes, the present invention may utilize a two-way initialization procedure wherein the transmitter flashes patterns having default sizes and orientations which are analyzed in the receiver to calculate various performance characteristics such as resolvable sub-group size and relative orientations. Another method to diagnose incorrect performance characteristic settings may be through the use of regularly spaced parity bits that are used for error correction at another location and time than the error correction bit. Such a method is well known, such as in the use of QR codes and may be applied here.

Figure 19:
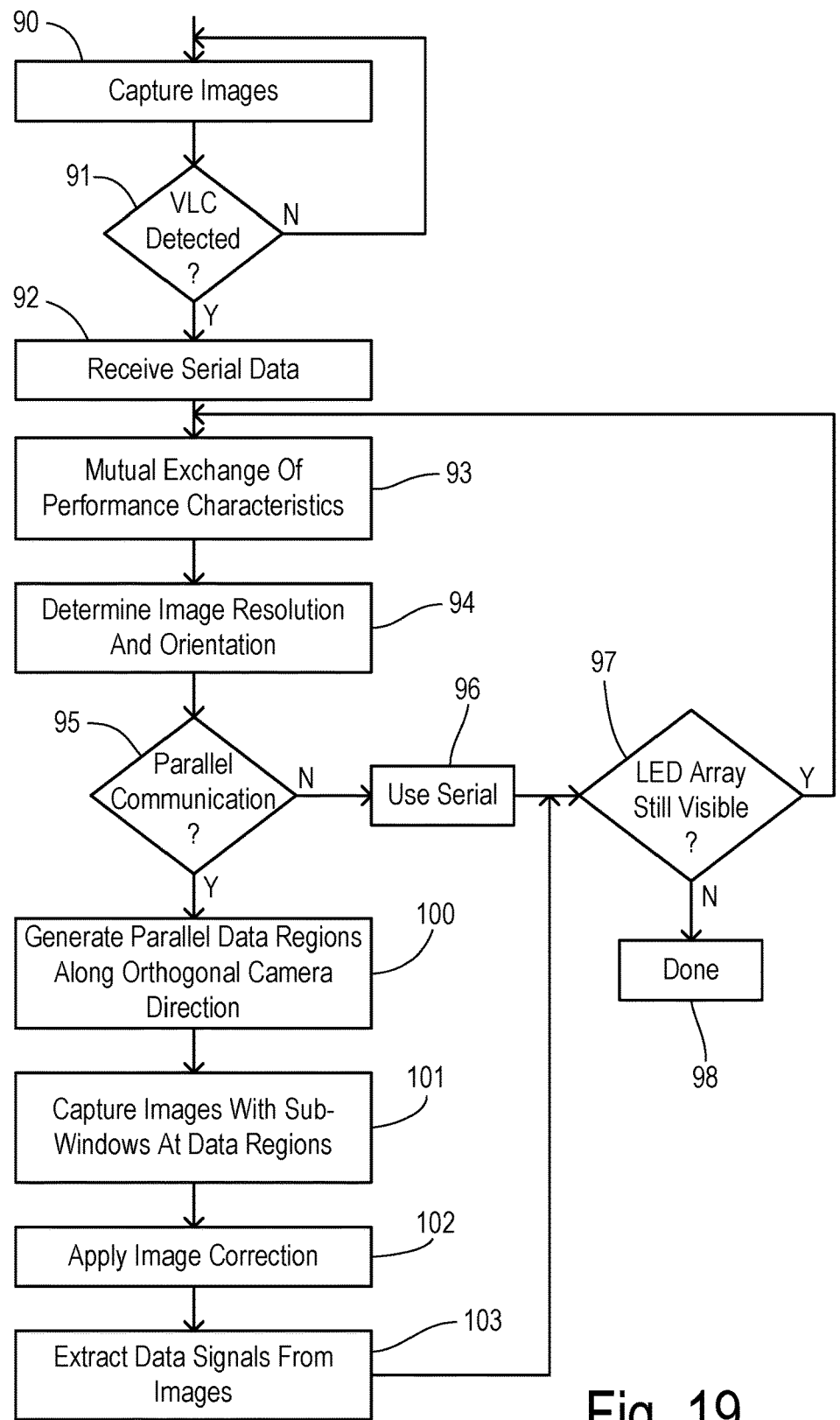
FIG. 19 is a flowchart showing one preferred embodiment of the invention.

A preferred method of the invention is shown in FIG. 19. Before commencing VLC communication, a receiver mounted on a moving vehicle captures successive image frames (i.e., video) in step 90. The successive images are analyzed (e.g., filtered) to identify any active VLC sources. A check is performed in step 91 to determine whether any VLC sources are undetected. If not, then a return is made to step 90 to continue to monitor for a VLC source. Once a source is detected, then serial data is received from the detected VLC transmitter in step 92. For example, the VLC transmitter may initially be sending a VLC beacon signal using an entire LED array (or large part of it) in order to initiate communication with a receiver. Once the beacon signal and/or serial data is received, the VLC receiver may contact the transmitter via the return channel. A mutual exchange of performance characteristics (e.g., based on appearance of the VLC source in the capture images) is performed in step 93. In step 94, the transmitter and receiver determine and share image resolution, apparent size, relative orientation of their respective grids, image intensity, distortion, and other aspects of the performance characteristics.

Based on an analysis of the performance characteristics, a determination is made in step 95 whether parallel communication using a one-dimensional pattern of parallel subgroups of LED sources is possible. If parallel communication is not feasible, then serial communication continues to be used in step 96. Then a check is periodically performed in step 97 to determine whether the LED array is still visible. If not, then the method ends at step 98. If the LED array is still visible, then a return is made to step 93 to re-perform the exchange of performance characteristics and to re-determine whether parallel communication has become possible.

When parallel communication is possible, then parallel data regions (sub-blocks of an identified area on the LED array) are generated in step 100 such that the sub-blocks form a one-dimensional pattern along an orthogonal camera direction. In the case of a rolling shutter CMOS sensor, then the orthogonal camera direction is perpendicular to the direction of a rolling shutter row (wherein the pixels of a row are exposed simultaneously). It should be noted that in the present invention, a camera sensor with a rolling shutter does not require time synchronization and that the time varying one-dimensional horizontal data pattern may appear in one image or the next. It should be further noted that like VLC described in prior methods, an error correction method must be implemented to account for errors in receiving or decoding the correct data or loss of data through factors such frame-to-frame time gaps. A method to regularly vary parity check bits for error correction would occur in both time and the horizontal one-dimensional data direction. In a non-rolling shutter (i.e., global shutter) image sensor, the light source array could vary the pixel intensities across both horizontal and vertical directions to create a two dimensional grid-like pattern in which the display of one pattern would be timed to coincide with the global shutter exposure. This time synchronization may occur via methods known in prior art. As used herein, the term "orthogonal direction" for a global shutter image sensor means either one of the orthogonal rows and columns of the sensor. Furthermore, while the actions discussed above for aligning the pattern direction with a desired pixel direction of the camera utilize an electronically performed adjustment of the mapping of data regions (sub-blocks) onto the LED array, it is also possible to achieve a desired alignment by mechanical re-orientation of either the LED array or the image sensor (e.g., by mounting on a gimbal driven by a servomechanism). Of course, fixed permanent mounting of a transmitter and receiver could also ensure the desired orthogonal alignment in order to practice the present invention.

In order to improve image quality and to shorten the time between consecutive frames, subsequent images may be captured using sub-windowing in step 101. Sub-windowing refers to reading out of an image from the image sensor using only a portion of the full sensor pixel grid. The VLC source is tracked within several image frames, and then image collection is performed for a series of subsequent images to collect data only within the sub-windowed area. Periodically, full images may be captured in order to continue to correctly track the location of the VLC source array.

In step 102, other image corrections can be applied to captured images. For example, various distortions may be present in an image besides the discrepancy in vertical orientation of the respective grids. Based on analysis of a default pattern sent during initialization, compensation may be applied to either the pattern driven onto the transmitter array or to the captured image to reverse the distortion. Using the corrected images, data signals are extracted in step 103 in a known manner in order to reconstruct the originally encoded data.

The foregoing invention achieves higher data transfer speeds for light-based communication based on displaying an optical pattern from an LED array such that the light pattern is orthogonal to the rolling shutter direction of the camera even though the camera may be arbitrarily oriented and positioned in space. The data transfer is dependent upon both time variation of LED output (flashing) and a one-dimensional (1-D) binary array output of the LED array (which is determined based on the camera's ability to differentiate more than one "pixel" or sub-blocks along the LED array). To achieve real world operation of this invention, a data exchange mechanism is used to provide the LED transmitter with knowledge of the camera's perspective, position, field of view (FOV), orientation, resolution, row readout time, distortion, and other factors to display the 1-D binary array output with a correct orientation for maximum use of the camera's capabilities. If an LED array is sending to multiple receivers, then it uses the capabilities of the camera operating at the "least common denominator."

The invention utilizes a rapidly changing 1-D LED pattern in which the rolling shutter effect of a CMOS based image sensor along with the temporal variation between camera pixel rows to create an effective 2-D pattern for encoding data. The invention provides N times more data transmission than normal VLC communication, where N is equal to the LED grid's effective spatial size determined by properties of the image sensor, lens, and operating distance. The process is far less sensitive to correct timing from a single or multiple cameras than prior art techniques and is far less sensitive to exposure timing and blooming. The process can support cameras of different exposure times and different frame to frame gaps without modifications.

The VLC receiver's camera would preferably identify an optimal exposure time to avoid over-exposure of the LED array and blurring of the 1-D binary array output. This may entail active modulation of the data output frequency by the LED to match the camera's rolling shutter speed and exposure length. In addition, sub-windowing can be used to increase image capture and thus data transmission speeds.

The relative data transmission rate increase will depend on a number of factors including distance between objects, rolling shutter orientation, LED array size, image sensor size, camera lens optical characteristics, required exposure duration, environmental noise level, and more. Detection and communication between transmitter and receiver preferably starts with standard VLC wherein all LEDs are operated uniformly in parallel during an initial data exchange. The initial exchange determines whether the transmitter's LED array is sufficiently large within the camera image to employ this method. This determination may also take into account quality of service with other VLC devices that are also communicating with the same transmitter. Data exchange includes sensor characteristics and LED array characteristics, including camera lens optical characteristics, rolling shutter direction, and exposure duration. This may also employ use of VLC to determine the relative position of the transmitter to the receiver. The camera can utilize image capture sub-windowing over the specific region of interest corresponding to the LED array to increase data throughput. The LED 2-D array transmits data by varying its intensity and/or color in an orthogonal direction to the camera's rolling shutter. The number of unique LED "pixels" or sub-blocks depends on the capability of detection by the receiving CMOS censor. Additionally, the direction of the 1-D pattern for the LED sub-blocks can extend in any arbitrary direction, e.g., left-right, up-down, or some relative rotation (skew) based on the LED array and camera positions and distortion. After a certain amount of time the initialization process may be repeated given the possibility of the camera and LED array shifting position or being blocked from the field of view. Such a fallback state will be helpful in confirming integrity of data transfer and a correct angle of the LED lighting patterns. At this step the LED intensity may also be altered.

Depending on the LEDs intensity, camera sensor sensitivity, and exposure duration, the captured image of the LED array may appear under or over exposed. This could result in blurry demarcation of the data encoded in the rolling shutter image and/or poor signal-to-noise ratio. Therefore, an adaptive process of determining the optimal exposure length per each pixel row may be desirable. For example, a sequence of images can be obtained using a range of exposures. Furthermore, error correction parity bits or some other error correction scheme dispersed throughout the 1-D pattern and time may be used to monitor for changes in performance characteristics. Specifically, the receiver may monitor the data transmission rate over time or across the 1-D pattern to detect an increase in error rates and resend the performance characteristics to the transmitter to improve the data transmission. Afterwards, the optimal exposure can be identified in the images, and the exposure time that results in the best presentation of the data pattern as captured by the rolling shutter would be used. Alternatively, an image sensor with a higher dynamic range could be used.

The invention can be used not only for vehicular transportation functions, but also for indoor consumer electronics LIFI products and for other types of outdoor data communication systems (e.g., cell phone VLC transmission to a vehicle-mounted camera sensor). The invention can be adapted to use color keying by utilizing multiple color layers. Instead of visible light, near-infrared LEDs which are not visible to human eye can be used (especially with a camera sensor not having an IR cutoff filter). This would permit more placement options for the LED array beyond those which might otherwise be allowed in view of styling considerations for a vehicle.

What is claimed is:

1. A light communication system comprising:
    a transmitter modulating an array of light sources to encode data, wherein the array of light sources is comprised of a plurality of LEDs in a two-dimensional grid;
    a receiver with a two-dimensional array of pixels defining rows and columns imaging the sources to receive the data using a rolling shutter in a predetermined direction;
    wherein the transmitter initially emits a serial data signal;
    wherein the transmitter and receiver exchange performance characteristics after the receiver detects modulation of the sources by the serial data signal;
    wherein the receiver and transmitter establish a return channel to exchange performance characteristics to determine whether the receiver can resolve a parallel data signal encoded by sub-blocks of the LEDs in the array of light sources: and
    wherein, if the receiver can resolve the parallel data signal, the transmitter further modulates the light sources to encode bits of the data in adjacent sub-blocks of the LEDs aligned in a one-dimensional pattern extending orthogonal to the predetermined direction as received by the receiver.

2. The system of claim 1 wherein the array of pixels is comprised of a CMOS image sensor.

3. The system of claim 1 wherein the performance characteristics from the receiver to the transmitter are sent by the return channel using light communication.

4. The system of claim 1 wherein the performance characteristics from the receiver to the transmitter are sent by the return channel using RF communication.

5. The system of claim 1 wherein performance characteristics are selected from a group comprising number of light sources, arrangement of light sources, number of receiver pixels, arrangement of receiver pixels, nominal exposure time for a pixel row of the receiver, apparent size of a sub-block of a modulated group of light sources as detected by the receiver, relative orientations of the transmitter and receiver, identification of the predetermined rolling shutter direction, and relative movement between the transmitter and receiver.

6. The system of claim 1 wherein at least some of the sub-blocks include a plurality of adjacent light sources to encode a respective bit of the data.

7. The system of claim 1 wherein the transmitter adjusts the alignment of the one-dimensional pattern according to an identification of the predetermined rolling shutter direction.

8. A method of transmitting data using visible light communication (VLC), comprising:
    a VLC transmitter emitting a serial data signal from a two-dimensional LED array;
    a VLC receiver detecting the serial data signal by monitoring images collected by an image sensor having a two-dimensional pixel array;
    the VLC receiver establishing a return channel for communicating with the VLC transmitter;
    the VLC receiver and the VLC transmitter exchanging performance characteristics to determine whether the VLC transmitter can emit parallel data bits from respective LED blocks within the LED array which can be resolved by the VLC receiver;
    the VLC transmitter modulating the respective LED blocks to encode parallel bits of the data in a one-dimensional pattern extending along a pixel direction of the image sensor.

9. The method of claim 8 wherein the image sensor is comprised of a CMOS image sensor with a rolling shutter, and wherein the pixel direction along which the one-dimensional pattern extends is orthogonal to a direction of the rolling shutter.

10. The method of claim 9 wherein a period for modulating the respective LED blocks is less than an exposure time of a row of pixels for the rolling shutter.

11. The method of claim 8 further comprising the steps of:
reading out an image from the image sensor from a sub-windowing region substantially restricted to receiving light from the LED array; and
decoding the one-dimensional pattern to recover the parallel bits.

12. The method of claim 8 wherein the performance characteristics include a geometry of the serial data, and wherein the LED blocks that are modulated to encode parallel bits of the data in a one-dimensional pattern are adjusted in order to compensate for a distortion exhibited by the geometry.

13. The method of claim 8 wherein the image sensor is comprised of a charge-coupled device (CCD).

14. The method of claim 8 wherein the image sensor is configured to read out images using a global shutter.

* * * * *